United States Patent Office 3,583,956
Patented June 8, 1971

3,583,956
VINYL CHLORIDE POLYMERS
Bruce Robert Owen Pointer, Welwyn Garden City, and Alex Edward Bond, Harpenden, England, assignors to Imperial Chemical Industries Limited, London, England
No Drawing. Filed Sept. 9, 1968, Ser. No. 758,580
Claims priority, application Great Britain, Sept. 25, 1967, 43,540/67
Int. Cl. C08f *15/06*
U.S. Cl. 260—86.3
13 Claims

ABSTRACT OF THE DISCLOSURE

Process for producing vinyl chloride copolymers having a lower softening point than polyvinyl chloride, comprising initially polymerizing vinyl chloride to at least 40% conversion, adding a different vinyl monomer in an amount less than the remaining unreacted vinyl chloride, and continuing the polymerization at a temperature which is at least 5° C. higher than the first polymerization temperature.

---

This invention relates to vinyl chloride polymers and in particular to a process for making vinyl chloride polymers having improved processing characteristics, in most cases manifested by having rapid fusion or gelation characteristics.

When vinyl chloride polymers are processed into shaped articles, the polymer powder is generally mixed with various additives such as stabilisers, lubricants, processing aids, pigments and fillers as may be desired in order to donate various properties to the composition and is heated to fuse the mass into a homogeneous or gelled mass. In the interests of, inter alia, economy it is desirable to minimise such heat treatment and so it is desirable to use a polymeric material that will fuse or gel rapidly.

A process for the production of fast fusing vinyl chloride polymers has been described in French patent specification 1,420,057 which involves the polymerisation of vinyl chloride in an aqueous medium and adding a minor amount of a comonomer such as vinylidene chloride at a late stage in the polymerisation process.

We have found that a greater improvement in the fusion characteristics may be obtained by a modification of that process.

Accordingly we provide a process for the production of a vinyl chloride polymer comprising polymerising vinyl chloride at a first polymerisation temperature until at least 40% by weight of the vinyl chloride is converted to polymer and then adding an ethylenically unsaturated monomer, other than vinyl chloride, that is copolymerisable with vinyl chloride to form a copolymer of lower softening point than polyvinyl chloride, in an amount by weight of less than the weight of the remaining unreacted vinyl chloride and then polymerising the mixture of the remaining vinyl chloride and the comonomer at a temperature at least 5° C. higher than said first polymerisation temperature.

Ethylenically unsaturated monomers that may be copolymerised with vinyl chloride to give materials of lower softening point than polyvinyl chloride include vinyl esters such as vinyl acetate and vinyl stearate; vinylidene chloride; vinyl ethers such as isobutyl vinyl ether; alkyl acrylates and methacrylate such as ethyl acrylate, butyl acrylate, 2-ethyl hexyl acrylate, and methyl methacrylate; olefines such as ethylene, propylene, 4-methyl penetene-1, dodecene-1, and tetradecene.

By the term "lower softening point than polyvinyl chloride" we means that the copolymer obtained by polymerising the same amount of unreacted vinyl chloride remaining in the reaction vessel at the time of addition of the comonomer in the process of our invention with the amount of comonomer added has a lower $\frac{1}{10}$ Vicat softening point (British Standard 2782, Part 1, Method 102F) than that of vinyl chloride homopolymer prepared under the same conditions. Thus, for example, if a vinyl chloride homopolymer prepared by polymerisation at 50° C. has a $\frac{1}{10}$ Vicat softening point of 80° C. then for a comonomer X to be suitable for use in the process of the present invention when added to the polymerisation at 50° C. of 100 parts by weight of vinyl chloride in an amount of, say, 5 parts by weight when the conversion of vinyl chloride to polymer is, say, 70% i.e. leaving 30 parts by weight of unreacted vinyl chloride, a copolymer made by copolymerising 30 parts by weight of vinyl chloride with 5 parts by weight of the comonomer X, under the same conditions at 50° C., must have a $\frac{1}{10}$ Vicat softening point of less than 80° C.

The amount of commonomer used should be less than the amount of unreacted vinyl chloride remaining in the autoclave of reaction vessel at the time of addition of the comonomer. Thus if the comonomer is added when the conversion of monomeric vinyl chloride to polymer is 70% by weight, i.e. leaving 30% by weight of the original vinyl chloride monomer unreacted, up to 30% by weight, based on the weight of vinyl chloride of the original monomer charge, of the comonomer may be added, while if the comonomer is added when the conversion of monomeric vinyl chloride to polymer is 90% by weight, only up to 10% by weight, based on the weight of the original vinyl chloride monomer charge, of the comonomer may be added. Generally the amount of comonomer added is relatively small and is preferably from about 0.1 to 10%, preferably at least 0.2% by weight and preferably less than 5% by weight, based on the weight of the original vinyl chloride charge.

As set out above, the comonomer is added when the conversion of the vinyl chloride to polymer has reached at least 40% by weight. If it is added before this, then little or no advantage in gelation characteristics will be obtained over a coploymer made with the comonomer present throughout reaction. Likewise in order to ensure that the amount of copolymer formed in the latter stage of the process is sufficient to have a marked effect on the gelation properties of the polymer composition, we prefer that the comonomer is added before 95% by weight of the initial monomeric vinyl chloride charge has been converted to polymer.

We have found that the optimum effect on gelation characteristics is obtained when the comonomer is added before the conversion of vinyl chloride to polymer has reached 70% by weight and a particularly preferred range of conversions at which to add the comonomer is 42 to 65% by weight.

The degree of conversion of monomer to polymer at any particular reaction time may be established by a series of experiments in which vinyl chloride is polymerised under the same conditions, and in separate experiments stopping polymerization at different times by venting off the monomer remaining and determining the amount of polymer formed. The conversion may then be calculated and so a graph of conversion against reaction time can be plotted.

The temperature of the copolymerisation process should be at least 5° C. higher than the temperature of the homopolymerisation stage of the reaction, and is preferably from 10 to 35° C., particularly 15 to 30° C. higher.

One of the factors that affects the ease of gelation of vinyl chloride polymers is the K-value, which in this specification is obtained from measurements of the relative viscosity ($\eta_{rel}$) of a solution of 0.5 gm. polymer in 100 ml. ethylene dichloride at 25° C. using the equation $$\log_{10} \eta_{rel} = \left[ \frac{75k^2}{1+1.5kc} + k \right] c$$

where K-value, $K=1000k$ and $c=$ concentration of solution in gm./100 ml.

As the K value, which is an indirect measure of the molecular weight of the polymer, increases so the polymer becomes more difficult to gel. Conversely the lower the K-value, the easier it is to gel the polymer. However it is not possible merely to reduce the K-value in order to obtain a material having good gelation characteristics as lowering the K-value generally adversely affects other properties of the polymer in particular mechanical properties.

In the following table the gelation characteristics measured on some vinyl chloride homopolymers of differing K-values are set out. The gelation temperature is measured by the following method:

100 gm. of the polymer powder is mixed with 4 gm. of tribasic lead sulphate, 2 gm. of glyceryl monostearate and 1 gm. of calcium stearate. A certain weight (charge weight) of the composition is charged to a Brabender Plastograph fitted with a cam mixing head having a chamber capacity of 85 cc. at a chamber temperature of just less than 80° C. The temperature of the chamber is then increased at 2° C. per minute by increasing the temperature of the circulating oil while the material in the chamber is mixed by a stirrer fitted with blades and rotating at 30 r.p.m. The torque required to rotate the stirrer is measured and plotted against chamber temperature. Fusion is considered to have occurred when the torque passes through a maximum as the polymer particles cohere together to form a continuous melt. The chamber temperature at which this maximum occurs is termed the gelation temperature.

| K value of homopolymer: | Gelation temperature ° C. (charge weight 75 gm.) |
|---|---|
| 50 | 166 |
| 55 | 179 |
| 60 | 182 |
| 65 | 199 |

If a smaller charge weight is used then the gelation temperature will be somewhat higher as the polymer is subjected to less intensive shear working.

The above test procedure is used in the examples described hereinafter, except in Example 8 where a different technique, as described therein, is utilised for measuring the gelation characteristics of after chlorinated materials.

The main factor that determines the K-value of any particular homopolymer is the temperature at which the monomer is polymerised. As the temperature is increased, so the K-value is decreased.

In the case of copolymerisation, some comonomers, particularly propylene, act as chain transfer agents, reducing the K-value and also retarding the polymerisation rate. Consequently in order to obtain a sufficiently high K-value product the polymerisation temperature has to be further reduced.

Since the general aim when producing a modified vinyl chloride polymer is generally to produce a polymer of similar K-value, the polymerisation temperatures used in the first and second stages of the process should be selected so as to give the required K-value.

In general both stages of the process may be carried out at temperatures normally used for vinyl chloride polymerisation in the range 30 to 85° C.

Preferably the first stage is conducted at a temperature within the range 35 to 60° C. and the second stage is preferably conducted at a temperature within the range 65 to 80° C. Thus, for example the homopolymerisation may be performed at 50° C. and the copolymerisation at 55 to 85° C., preferably 65° C. to 80° C.

If higher temperatures are used the K-value will generally be too low for acceptable mechanical properties while if lower temperatures are used the polymerisation rate may be too slow to be economically acceptable. While the latter defect can be overcome to some extent by the use of an incerased concentration of catalyst, this is liable to adversely affect the heat stability of the polymer.

In the process of the present invention, after addition of the comonomer, the polymerisation is continued at a higher temperature.

It is not essential however that the temperature should be increased suddenly. Indeed it is often advantageous, in the interests of ease of controlling the reaction, to permit the temperature to increase slowly or in distinct stages. As the polymerisation of vinyl chloride is an exothermic reaction, the temperature may conveniently be increased by reducing or stopping the flow of cooling medium, generally water, applied to control the reaction.

The temperature may be increased before, during or after the addition of the comonomer. We prefer to increase the temperature at the same time as adding the comonomer.

For many applications, e.g. rigid extrusions the comonomer content of the final polymer is preferably within the range 0.3 to 2.0% molar (corresponding to 0.4 to 2.75% by weight for vinyl acetate and 0.2% to 1.4% by weight for propylene as the comonomer), although higher or lower comonomer contents may be used.

The proportion of comonomer combined in the copolymer depends on a variety of factors including the relative reactivities at the second stage polymerisation temperature of the comonomer and vinyl chloride; the relative proportions of vinyl chloride and comonomer present in the second stage of the polymerisation process; and the length of the second stage polymerisation process.

For example, we have found that, under a certain set of polymerisation conditions, at a second stage polymerisation temperature in the range 65 to 80° C., with an initial amount of comonomer added of the order of 3% by weight of the initial weight of vinyl chloride used, about 75% by weight of the added comonomer is copolymerised in about 1½ hours if the comonomer is vinyl acetate, while about 40% of the comonomer is copolymerised in about 3 hours if the comonomer is propylene.

Thus it is clear that the copolymerisation reaction need not be taken to completion, but it should be continued for a sufficient time to effect at least 40% by weight conversion of the vinyl chloride remaining in the reaction vessel at the time of addition of the comonomer to polymer.

The polymerisation reaction may be carried out by any suitable process including bulk, solution, emulsion or suspension polymerisation processes. However, polymerisation in aqueous suspension is strongly preferred, using monomer soluble catalysts. Suitable catalysts include diacyl peroxides such as lauroyl and benzoyl peroxide; peroxydicarbonates such as diisopropyl peroxydicarbonate; acyl cycloalkyl sulphonyl peroxides such as acetyl cyclohexyl sulphonyl peroxide; and azo compounds such as $\alpha,\alpha'$-azodiisobutyronitrile. The amount of catalyst used will depend on, inter alia, the reaction temperature utilised and on the nature of the catalyst but amounts within the range 0.005 to 2% by weight of the vinyl chloride initially charged are generally suitable. Mixtures of catalysts may be used if desired.

Dispersing agents may be added to the reaction mixture if desired and are generally water soluble protective colloids such as gelatin, partially or completely hydrolysed polyvinyl acetate, polyalkylene oxides such as polyethylene oxide, methyl cellulose or hydroxyethyl cellulose.

The amount of dispersing agent use is generally from 0.01 to 5%, preferably 0.04 to 1% by weight of the vinyl chloride originally charged to the autoclave.

From the examples it will be seen (see particularly Example 9) that in some cases, if the polymerisation temperature is not increased then the gelation temperature is lower than in the case where the polymerisation temperature was increased. However, this lower gelation temperature was associated with a poor yield and in fact when the products made by the process wherein the polymerisation temperature was increased were processed, it was found that the products of the present invention had the superior processability, notwithstanding the lower gelation temperatures of the products made at constant polymerisation temperature.

We have also found, most unexpectedly, that if copolymers made by the process of the present invention are after-chlorinated, then materials are obtained having a higher softening point than, but of similar processability to, after-chlorinated vinyl chloride homopolymers having a similar chlorine content.

Consequently by chlorinating these particular vinyl chloride copolymers (which themselves have lower softening points than the corresponding vinyl chloride homopolymers) to a lesser degree it is possible to obtain a material of equivalent softening point to an after-chlorinated vinyl chloride homopolymer and having improved processability, or by chlorinating to the same final chlorine content, to obtain a material of equivalent processability to an after-chlorinated vinyl chloride homopolymer but having an increased softening point.

The chlorination may be conducted by any of the well known techniques such as chlorination in suspension or in solution, or in powder form, for example using a fluidised bed.

We prefer however to use a suspension chlorination process wherein the copolymer is suspended in an inert medium such as carbon tetrachloride or water optionally containing a swelling agent such as carbon tetrachloride while chlorine gas is passed through the suspension. The chlorination is generally conducted with the assistance of illumination e.g. UV light and/or a chemical catalyst for example, oxygen, hydrogen peroxide, or a free radical initiator such as a dialkyl peroxide, or an alkyl hydroperoxide, or an azo compound such as azodiisobutyronitrile.

Examples of suitable chlorination processes are described in United Kingdom patent application specifications 893,288, 948,372, 976,001, 1,081,957, 1,093,374 and 1,101,540.

A typical chlorination process that may be used is to suspend the copolymer in carbon tetrachloride and while vigorously stirring heat the slurry to 70 to 80° C., purge the chlorination vessel with nitrogen to remove residual oxygen, and add chlorine at a rate consistent with good chloride uptake. After about 15 minutes during which the reaction medium becomes saturated with chlorine, a chemical catalyst, for example 0.1% by weight, based on the weight of the polymer, of azodiisobutyronitrile is added. Chlorine is continuously passed into the vessel until the desired chlorine content is reached (this may be assessed by measuring the amount of hydrogen chloride evolved). The chlorination vessel is then purged with nitrogen to remove excess chlorine and hydrogen chloride. The chlorinated polymer may be isolated by azeotropic distillation with methanol to remove the carbon tetrachloride and then filtering and drying the polymer in an oven. Instead of using an azeotropic distillation process the polymer can be isolated by continuously precipitating the polymer in methanol at room temperature.

The latter method is preferred as it gives a final product having a particle type that renders the polymer more readily processed.

Where an aqueous suspension chlorination process is used the catalyst may be uv light, oxygen, hydrogen peroxide, a dialkyl peroxide or an alkyl hydroperoxide. Diacyl peroxides are not very effective unless sufficient organic solvent, for example carbon tetrachloride is also added to dissolve the peroxide and carry it into the polymer particles.

The chlorination should be conducted to give a final chlorine content of in the range 60 to 69% by weight, depending on the desired softening point of the after-chlorinated polymer, and is preferably within the range 63 to 67% by weight.

The chlorinated heterogeneous copolymers may also be blended, if desired, with unchlorinated vinyl chloride homo- or co-polymers in order to provide a cheaper and more easily processed material than a chlorinated vinyl chloride homopolymer of equivalent softening point to the blend.

The copolymers prepared by the process of the present invention or their after-chlorinated counterparts may be compounded with the usual vinyl chloride polymer additives such as stablishers, lubricants, processing aids, plasticisers, impact modifiers, fillers, pigments and dyes depending on the application envisaged for the composition.

Compositions formed from the copolymers may be used for many purposes including both rigid and flexible applications such as sheet, film, rod, pipe, and other shaped articles made by techniques such as extrusion, calendering, injection moulding, blow moulding, or the powder fabrication processes such as fluidised bed coating or rotational casting.

The invention is illustrated by the following examples in which all parts and percentages are expressed by weight except where otherwise indicated.

EXAMPLE 1

A stainless steel reaction vessel of capacity 5 litres fitted with a stirrer was charged with 2.67 litres of distilled water; 2.6 gm. of partially hydrolysed polyvinyl acetate (dispersing agent); and 0.9 gm. of diisopropyl peroxydicarbonate (catalyst). The vessel was purged with nitrogen to remove residual air and then 1330 gm. of vinyl chloride were added, the vessel being continuously stirred. The vessel and contents were heated to 50° C. and maintained at that temperature while polymerisation of the vinyl chloride took place. After 3 hours, when the conversion was 40%, 40 gm. of vinyl acetate were added and the temperature increased to 78° C. Polymerisation was continued for a further 35 minutes and then the excess of monomer was vented off from the reaction vessel and the contents were centrifuged and the resulting polymer was washed and dried at 50° C. for 24 hours.

The polymerisation was repeated (run 1E) adding the vinyl acetate after 3½ hours polymerisation instead of 3 hours. After 3½ hours polymerisation the conversion was 53.

By way of comparison these polymerisations (runs 1A and 1E) were repeated, without increasing the temperature when the vinyl acetate was added, so that the polymerisation was conducted throughout at 50° C. (runs 1B and 1F). In addition further comparative examples were performed in which no vinyl acetate was added.

The K-values and gelation temperatures of the resulting polymers were measured by the methods described hereinbefore (using 70 gm. charge weight for measuring the gelation temperature) and the results set out in Table 1.

EXAMPLES 2 AND 3

The polymerisations of Example 1 where comonomer is injected were repeated but using (i) 40 gm. of vinylidene chloride and (ii) 40 gm. of propylene respectively in place of vinyl acetate. The results are shown in Table 1.

then the excess of monomer was vented off from the reaction vessel and the contents were centrifuged. The

TABLE 1

| Run No. | Polymerisation temperature (° C.) Initial Ti | Polymerisation temperature (° C.) Final Tf | Tf-Ti (° C.) | Comonomer Type | Amount injected (percent) By weight | Amount injected (percent) Molar | Time of comonomer addition and/or temperature change Time (hours) | Time of comonomer addition and/or temperature change Approximate conversion (percent) | Amount of comonomer in copolymer (percent) By weight | Amount of comonomer in copolymer (percent) Molar | Gelation temperature (70 gm. charge) (° C.) | K-value |
|---|---|---|---|---|---|---|---|---|---|---|---|---|
| 1A | 50 | 28 | 38 | Vinyl acetate | 3 | 2.2 | 3 | 40 | 1.0 | 0.73 | 178 | 55.8 |
| 1B | 50 | 50 | 0 | Vinyl acetate | 3 | 2.2 | 3 | 40 | 2.0 | 1.5 | 196 | 63.3 |
| 1C | 50 | 78 | 28 | None | 0 | 0 | 3 | 40 | 0 | 0 | 188 | 56.1 |
| 1D | 50 | 50 | 0 | None | 0 | 0 | — | — | 0 | 0 | >200 | 64.2 |
| 1E | 50 | 78 | 28 | Vinyl acetate | 3 | 2.2 | 3.5 | 53 | 1.1 | 0.8 | 154 | 57.8 |
| 1F | 50 | 50 | 0 | Vinyl acetate | 3 | 2.2 | 3.5 | 53 | 1.9 | 1.4 | 196 | 63.2 |
| 1G | 50 | 78 | 28 | None | 0 | 0 | 3.5 | 53 | 0 | 0 | 192 | 58.7 |
| 1D | 50 | 50 | 0 | None | 0 | 0 | — | — | 0 | 0 | >200 | 64.2 |
| 2A | 50 | 78 | 28 | Vinylidene chloride | 3 | 1.95 | 3 | 40 | 3.7 | 2.4 | 162 | 56.0 |
| 2B | 50 | 50 | 0 | Vinylidene chloride | 3 | 1.95 | 3 | 40 | 3.4 | 2.2 | 200 | — |
| 1C | 50 | 78 | 28 | None | 0 | 0 | 3 | 40 | 0 | 0 | 188 | 6.1 |
| 1D | 50 | 50 | 0 | None | 0 | 0 | — | — | 0 | 0 | >200 | 64.2 |
| 2C | 50 | 78 | 28 | Vinylidene chloride | 3 | 1.95 | 3.5 | 53 | 2.6 | 1.7 | 158 | 56.4 |
| 2D | 50 | 50 | 0 | Vinylidene chloride | 3 | 1.95 | 3.5 | 53 | 5.3 | 3.5 | 190 | 61.5 |
| 1G | 50 | 78 | 28 | None | 0 | 0 | 3.5 | 53 | 0 | 0 | 192 | 58.7 |
| 1D | 50 | 50 | 0 | None | 0 | 0 | — | — | 0 | 0 | >200 | 64.2 |
| 3A | 50 | 78 | 28 | Propylene | 3 | 4.4 | 3 | 40 | <1 | <1.5 | 162 | 55.1 |
| 3B | 50 | 50 | 0 | Propylene | 3 | 4.4 | 3 | 40 | <1 | <1.5 | 200 | 60.2 |
| 1C | 50 | 78 | 28 | None | 0 | 0 | 3 | 40 | 0 | 0 | 188 | 56.1 |
| 1D | 50 | 50 | 0 | None | 0 | 0 | — | — | 0 | 0 | >200 | 64.2 |
| 3C | 50 | 78 | 28 | Propylene | 3 | 4.4 | 3.5 | 53 | <1 | <1.5 | 178 | 56.0 |
| 3D | 50 | 50 | 0 | Propylene | 3 | 4.4 | 3.5 | 53 | <1 | <1.5 | 200 | 61.3 |
| 1G | 50 | 78 | 28 | None | 0 | 0 | 3.5 | 53 | 0 | 0 | 192 | 58.7 |
| 1D | 50 | 50 | 0 | None | 0 | 0 | — | — | 0 | 0 | >200 | 64.2 |

EXAMPLE 4

A stainless steel reaction vessel of capacity 160 litres fitted with a stirrer was charged with 80.5 litres of distilled water, 72 gm. of partially hydrolysed polyvinyl acetate (dispersing agent), and 20 gm. of diisopropyl peroxydicarbonate (catalyst). The vessel was purged with nitrogen to remove residual air and then 48 kgm. of vinyl chloride were added, the vessel being continuously stirred. The vessel and contents were heated to 57° C. and maintained at that temperature while polymerisation of the vinyl chloride took place. After various times (see Table 2) 1.5 kgm. of vinyl acetate were added and the temperature increased to 66.5° C. Polymerisation was then continued until the reaction pressure had dropped to 50 p.s.i.g. from the steady polymerisation pressure and resulting polymer was washed and dried at 50° C. for 24 hours.

The gelation temperature of the polymer was measured by the technique described hereinbefore using a charge weight of 73 gm.

The results are shown in Table 2.

EXAMPLES 5, 6 AND 7

The procedure of Example 4 was repeated using different initial and final temperatures. By way of comparison a vinyl chloride/vinyl acetate copolymer was made by a process wherein the vinyl acetate was charged to the reaction vessel with the vinyl chloride at the start of polymerisation and the temperature was maintained stant. The results are shown in Table 2.

TABLE 2

| Run No. | Polymerisation temperature (° C.) Initial Ti | Polymerisation temperature (° C.) Final Tf | Tf-Ti (° C.) | Time of vinyl acetate addition and temperature increase Time (hours) | Time of vinyl acetate addition and temperature increase Approximate conversion (percent) | Total reaction time (hours) | Vinyl acetate in copolymer (percent) By weight | Vinyl acetate in copolymer (percent) Molar | K-value | Gelation temp., ° C. (73 gm.) |
|---|---|---|---|---|---|---|---|---|---|---|
| 4A | 57 | 66.5 | 9.5 | 2.5 | 42 | 4.0 | 1.65 | 1.20 | 55.7 | 154 |
| 4B | 57 | 66.5 | 9.5 | 2.75 | 49 | 4.3 | 1.85 | 1.35 | 56.3 | 149 |
| 4C | 57 | 66.5 | 9.5 | 3.0 | 56 | 4.2 | 1.70 | 1.24 | 57.2 | 139 |
| 4D | 57 | 66.5 | 9.5 | 3.25 | 62 | 4.5 | 1.80 | 1.31 | 57.8 | 142 |
| 4E | 57 | 66.5 | 9.5 | 3.5 | 67 | 4.6 | 1.65 | 1.20 | 58.3 | 148 |
| 5A | 55.5 | 66.5 | 11 | 2.75 | 44 | 4.5 | 1.75 | 1.27 | 55.9 | 158 |
| 5B | 55.5 | 66.5 | 11 | 3.25 | 55 | 4.5 | 2.20 | 1.60 | 56.9 | 164 |
| 5C | 55.5 | 66.5 | 11 | 3.75 | 65 | 8.5 | 1.50 | 1.10 | 60.6 | 160 |
| 6A | 55.5 | 70 | 14.5 | 2.75 | 44 | 4.3 | 2.15 | 1.57 | 55.2 | 148 |
| 6B | 55.5 | 70 | 14.5 | 3.25 | 55 | 4.3 | 2.05 | 1.50 | 56.5 | 161 |
| 6C | 55.5 | 70 | 14.5 | 3.75 | 65 | 4.6 | 1.65 | 1.20 | 58.9 | 158 |
| 7A | 55.5 | 74 | 18.5 | 2.75 | 44 | 4.55 | 2.25 | 1.64 | 54.6 | 148 |
| 7B | 55.5 | 74 | 18.5 | 3.25 | 55 | 4.7 | 1.50 | 1.10 | 55.7 | 144 |
| 7C | 55.5 | 74 | 18.5 | 3.75 | 65 | 4.5 | 1.40 | 1.02 | 58.5 | 151 |
| 7D | 50 | 50 | 0 | 0 | 0 | — | 2.2 | 1.60 | 60.0 | 181 |

EXAMPLE 8

A stainless steel reaction vessel of capacity 260 litres fitted with a stirrer was charged with 129.5 litres of distilled water; 128 gm. of partially hydrolysed polyvinyl acetate (dispersing agent); various quantities of diisopropyl peroxydicarbonate (catalyst), depending on the initial polymerisation temperature. (For an initial temperature of 39° C., 131 gm. of catalyst was used while for the initial temperatures of 50° C., 54° C., 55.5° C. and 57° C., 36 gm. of catalyst was used.) The vessel was purged with nitrogen to remove residual air and then 77.2 kgm. of vinyl chloride were added, the vessel being continuously stirred. The vessel and contents were heated to an initial polymerisation temperature as given in Table 3 and maintained at that temperature while polymerisation of the vinyl chloride took place. After various times at that temperature, various amounts of comonomer were injected and the temperature increased to a final polymerisation temperature as set out in Table 3. Polymerisation was then continued until the reaction pressure had dropped to 50 p.s.i.g. from the steady value in the cases of the polymers containing vinyl acetate or after the predetermined reaction time in the cases of the polymers containing propylene as shown in Table 3, and then the excess of monomer was vented off from the reaction vessel and the contents were centrifuged. The resulting polymer was washed and dried at 50° C. for 24 hours. The gelation temperature was measured by the technique described hereinbefore using a charge weight of 75 gm.

The heat stability of the polymer was measured by compounding 100 parts of the polymer with 2 parts of a sulphur containing organo tin compound on a two roll mill wherein one roll was maintained at 140° C. while the other was maintained at 150° C. and then heating samples of the resulting crepe in a press at 180° C. for various lengths of time. The colour of the heated sample is then visually assessed by comparison with a set of standards ranging from water white to black and is assigned a number (1 to 5) corresponding to the standard. Thus the higher the number, the poorer the heat stability.

The $\frac{1}{10}$ Vicat softening point was also measured according to British Standard 2782 Part 1 Method 102F on samples prepared from the milled crepe. The results are shown in Table 4.

TABLE 3

| Run No. | Polymerisation temperature (° C.) | | Tf-Ti (° C.) | Catalyst concentration [1] (percent) | Comonomer | | | Time of comonomer addition and temperature increase | | Total reaction time (hours) |
| --- | --- | --- | --- | --- | --- | --- | --- | --- | --- | --- |
| | Initial Ti | Final Tf | | | Nature | Amount injected [1] (percent) | | Time (hours) | Approximate [1] conversion (percent) | |
| | | | | | | Weight | Molar | | | |
| 8A | 39 | 78 | 39 | 0.17 | Vinyl acetate | 2.6 | 1.9 | 5.5 | 61 | 7.5 |
| 8B | 50 | 78 | 28 | 0.047 | do | 2.6 | 1.9 | 5.5 | 66 | 6.75 |
| 8C | 55.5 | 78 | 22.5 | 0.047 | do | 3.0 | 2.2 | 3.5 | 60 | 4.7 |
| 8D | 50 | 72 | 22 | 0.047 | do | 2.6 | 1.9 | 5.5 | 66 | 6.8 |
| 8E | 39 | 74 | 35 | 0.17 | Propylene | 1.9 | 2.8 | 5.5 | 61 | 9 |
| 8F | 39 | 76 | 37 | 0.17 | do | 1.9 | 2.8 | 5.5 | 61 | 9 |
| 8G | 50 | 76 | 26 | 0.047 | do | 2.6 | 3.8 | 5.5 | 66 | 9 |
| 8H | 50 | 77 | 27 | 0.047 | do | 2.6 | 3.8 | 5.5 | 66 | 9 |
| 8I | 50 | 78 | 28 | 0.047 | do | 1.3 | 1.9 | 5.5 | 66 | 9 |
| 8J | 54 | 68 | 14 | 0.047 | do | 3.9 | 5.7 | 3.75 | 60 | 8 |
| Control | 57 | 57 | 0 | 0.047 | None | 0 | 0 | | | 6.5 |

[1] Based on initial amount of vinyl chloride used.

TABLE 4

| Run No. | Tf-Ti (° C.) | Comonomer | | | K Value | Gelation temperature,° C. (75 gms.) | $\frac{1}{10}$ Vicat softening Point,° C. | Heat stability colour No. after milling for— | | | | |
| --- | --- | --- | --- | --- | --- | --- | --- | --- | --- | --- | --- | --- |
| | | Nature | Amount found in copolymer | | | | | 2 min. | 10 min. | 20 min. | 30 min. | 45 min. |
| | | | Percent by weight | Percent molar | | | | | | | | |
| 8A | 39 | Vinyl acetate | 3.0 | 2.2 | 64 | 123 | 73.6 | 2 | 4 | 5 | | |
| 8B | 28 | do | 1.4 | 1.0 | 57.2 | 119 | 74.1 | 1 | 2 | 4 | 5 | |
| 8C | 22.5 | do | 2.4 | 1.75 | 54.3 | 120 | 71.4 | | | | | |
| 8D | 22 | do | 1.9 | 1.4 | 57 | 124 | 72.9 | 1 | 2 | 4 | 5 | |
| 8E | 35 | Propylene | 1.4 | 2.1 | 59.5 | 114 | 74.2 | 2 | 2 | 4 | 5 | |
| 8F | 37 | do | 2.1 | 3.0 | 58 | 117 | 71.8 | 1 | 2 | 4 | 5 | |
| 8G | 26 | do | 1.05 | 1.6 | 55.2 | 120 | 73.2 | 1 | 1 | 2 | 4 | 5 |
| 8H | 27 | do | 1.0 | 1.5 | 57.6 | 127 | 74.7 | 1 | 1 | 2 | 4 | 5 |
| 8I | 28 | do | 0.5 | 0.7 | 55.2 | 120 | | 1 | 1 | 2 | 5 | |
| 8J | 14 | do | 1.0 | 1.5 | 54.3 | 112 | 74.4 | | | | 4 | 5 |
| Control | 0 | None | 0 | 0 | 60 | 193 | 76.6 | 1 | 1 | 2 | 4 | 5 |

The products of runs 8D and 8H were chlorinated by the following technique.

1500 gm. of the copolymer was slurried in a chlorination vessel in 9 litres of carbon tetrachloride with vgoirous stirring and the mixture was heated to 73° C. The vessel was then purged with nitrogen to remove residual air and chlorine was then introduced into the slurry at a rate consistent with good chlorine uptake. After 15 minutes, during which time the reaction medium had become saturated with chlorine 1.5 gm. of azodiisobutyronitrile was added and the chlorine was continuously passed into the vessel. The hydrogen chloride evolved was measured in order to check on the progress of the chlorination and after about 3 hours the vessel was purged with nitrogen to remove the excess of chlorine and hydrogen chloride. The resultant mixture was azeotropically distilled with methanol to remove the carbon tetrachloride and the resultant chlorinated copolymer was filtered and dried in an oven at 60° C.

100 parts of the chlorinated polymer were mixed with 1.75 parts of tribasic lead sulphate, 1.5 parts of calcium stearate and 3 parts of glyceryl monostearate. The composition was then milled into a crêpe on a two roll mill in which the rolls were maintained at 170° C. and 180° C. respectively.

The softening point was measured by the cantilever softening point test (British Standard 2882 Method 102c) using samples of size 1.25 inches x 0.25 inches x 0.06 inches formed from the milled crêpe. These samples are clamped horizontally at one end and immersed in a bath of glycerine. A 20 gm. weight is suspended at the unclamped end of the sample by means of a 1/16 inch diameter hole 0.062 inch from the end of the sample. The temperature of the glycerine bath is raised at 1° C. per minute from room temperature and the softening point is quoted as the temperature at which the sample has sagged through 30°.

The processing characteristics of the chlorinated polymers were measured using a mixture of 100 parts of the chlorinated polymer powder, 4 parts of tribasic lead sulphate, 2 parts of glyceryl monostearate and 1 part of calcium stearate. Various amounts (charge weights) of the mixture was charged to a Brabender Plastograph fitted with a can mixing head having a chamber capacity of 30 ml. and maintained at a temperature of 180° C. The material in the chamber is mixed by a stirrer fitted with blades and rotating at 30 r.p.m. The torque required to rotate the stirrer is measured and plotted against the time from introducing the charge. Fusion is considered to have occurred when the torque passes through a maximum as the polymer particles cohere together to form a continuous melt. The time at which this maximum occurs is termed the gelation time. The equilibrium value of the torque, i.e. the value to which it levels out after passing through the maximum is also measured. The shorter the gelation time and the lower the equilibrium torque, therefore, the better is the processability of the composition.

The gelation time and equilibrium torque were also measured at a chamber temperature of 200° C.

The various results are quoted in Table 5 together with data on chlorinated vinyl chloride homopolymers of similar molecular weight and chlorine content.

Also presented in Table 5 are the softening points of chlorinated vinyl chloride homopolymers of equal chlorine content to the chlorinated copolymers, obtained from a graph of softenig point v. chlorine content of a series of chlorinated vinyl chloride homopolymers. From this table it is readily seen that although the basic heterogeneous copolymers have lower or similar softening points to the homopolymers, upon chlorination the softening point is markedly increased compared with homopolymers chlorinated to a similar final chlorine content but the processability of the chlorinated copolymer is similar to that of the chlorinated homopolymer.

Alternatively, by comparing sample 5 with the control samples 1 and 2, it is seen that a similar softening point as the chlorinated homopolymer can be achieved by chlorinating a heterogeneous copolymer to a lesser degree, and such a chlorinated heterogeneous copolymer has improved processability compared with a chlorinated homopolymer of similar softening point.

TABLE 5

| Basic polymer | | | | Chlorinated polymer | | | Cantilever softening point (° C.) | | Gelation properties | | | | | | | | | | | |
|---|---|---|---|---|---|---|---|---|---|---|---|---|---|---|---|---|---|---|---|---|
| Sample | Nature of polymer | Percent comonomer | K value | 1/10 Vicat softening point (° C.) | Isolation method | Chlorine content (percent) | Chlorinated polymer | Chlorinated homopolymer of same chlorine content | Chamber temperature 180° C., Charge weight (gm.) | | | | | | | Chamber temperature 200° C., Charge weight (gm.) | | | | |
| | | | | | | | | | Gelation time (secs.) | | | | Torque (m. kg.) | | | Gelation time (secs.) | | Torque (m. kg.) | | |
| | | | | | | | | | 27 | 30 | 33 | 36 | 27 | 30 | 33 | 36 | 30 | 33 | 36 | 30 | 33 | 36 |
| 1 | Homopolymer | | 60 | 76.6 | | 66 | 118 | 118 | | 260 | 220 | 140 | | | 1.9 | 2.1 | 2.4 | 270 | 180 | 150 | 1.7 | 1.9 |
| 2 | do | | 50 | 74 | | 65 | 115 | 115 | | 250 | 180 | 120 | | | 1.9 | 2.1 | 2.3 | 270 | 165 | | 1.7 | 1.9 |
| 3 | Vinyl chloride/vinyl acetate copolymer (8D) | 1.9 | 57 | 72.9 | Separate by azeotropic distillation | 66.3 | 121 | 126 | | | | | | | | | | 300 | 270 | 180 | | 1.8 |
| 4 | Vinyl chloride/propylene copolymer (8H) | 1.0 | 57.6 | 74.7 | do | 66.5 | 125 | 121 | 240 | | | | 1.4 | | | | | 300 | | 210 | | 2.1 |
| 5 | do | 1.0 | 57.6 | 74.7 | Separate by precipitation | 64.0 | 115 | 107 | | 170 | 130 | 60 | | | 1.8 | 2.0 | 2.0 | 210 | | 165 | 1.6 | 2.0 |
| 6 | do | 1.0 | 57.6 | 74.7 | do | 65.7 | 128 | 116 | | 300 | 280 | 120 | | | 2.1 | 2.1 | 2.4 | 270 | | 195 | 2.0 | 2.2 |
| 7 | do | 1.0 | 57.6 | 74.7 | do | 68.3 | 143 | 133 | | | | | | | | | | | | | | |

EXAMPLE 9

The procedure of Example 4 was repeated but using:

water—80.5 litres
vinyl chloride—48 kgm.
partially hydrolysed polyvinyl acetate—85 gm.
diisopropyl peroxydicarbonate—22.2 gm.

The nature and amount of comonomer used is set out in Table 6 together with the polymerisation temperatures and other data. The gelation temperature was measured using 70 gm. of the composition.

From a comparison of runs 9B and 9C and 9D and 9E it is seen that in the cases where the temperature was increased the gelatin temperature was in fact higher than when the temperature was kept constant. However, it is seen that increasing the temperature markedly increases the yield and also the amount of comonomer combined in the copolymer.

100 parts of the polymer were milled on a two roll mill, the rolls of which were maintained at 170° C. and 180° C. respectively, with 6 parts of a barium-cadmium soap as a heat stabiliser, 3 parts of epoxidised soya bean oil and 1 part of stearic acid, and then calendered into film using a calender temperature profile of 170/173/176/178° C. and an output speed of 35 ft./minute. In spite of the difference in gelation temperatures, the products of runs 9A, 9C, 9E, 9F and 9G gave haze free films, while those of runs 9B and 9D gave hazy films thereby indicating that the products of runs 9B and 9D had inferior processability to those of the other runs.

EXAMPLE 10

The procedure of Example 4 was repeated using the following ingredients.

water—80.5 litres
vinyl chloride—48 kgm.
partially hydrolysed polyvinyl acetate—85 gm.
diisopropyl peroxydicarbonate—22.2 gm.
The other details are given in Table 7.

EXAMPLE 11

For comparative purposes vinyl chloride/propylene copolymers were made by a process in which all the propylene is charged initially. In one polymerisation the temperature was maintained constant whereas in the other polymerisation is was increased.

The procedure used was as follows:

A stainless steel reaction vessel of capacity 160 litres fitted with a stirrer was charged with 75 litres of distilled water; 62.5 gm. of partially hydrolysed polyvinyl acetate as a dispersing agent and 52.6 gm. of diisopropyl peroxydicarbonate as catalyst. The vessel was purged with nitrogen to remove residual air and then 47 kgm. of vinyl chloride and 3.25 kgm. of propylene were added, the vessel being continuously stirred. The vessel and contents were heated to 50° C. and maintained at that temperature while copolymerisation of the vinyl chloride and propylene took place. In one polymerisation after 9 hours reaction time the reaction temperature was increased to 70° C. When the pressure in the reaction vessel had dropped to 200 p.s.i.g. from the steady polymerisation pressure, the excess of monomer was vented off from the reaction vessel and the contents were centrifuged. The resulting polymer was washed and dried at 50° C. for 24 hours.

The gelation temperature of the copolymer was measured by the technique described hereinbefore, using a charge weight of 70 gm.

The results are shown in Table 8.

While these results cannot be compared directly with those of other examples, for example those of Example 3, as the propylene content of the final copolymer is much larger and the K-value is much lower, these results show that increasing the polymerisation temperature in a copolymerisation reaction where the comonomer is added at the start of polymerisation has substantially no effect or even an adverse effect on the gelation characteristics of the copolymer.

TABLE 7

| | Polymerisation temp. | | | Amount of comonomer[1] injected | | When comonomer added and temperature increased | | Total reaction Time (hrs.) | Amount of comonomer in copolymer | | K value | Gelation temperature (°C.) (75 gm.) | 1/10 Vicat softening point (° C. |
|---|---|---|---|---|---|---|---|---|---|---|---|---|---|
| Run | Initial Ti (° C.) | Final Tf (° C.) | Tf-Ti | Percent by weight | Percent molar | Time (hrs.) | Approximate conversion (percent)[1] | | Percent by weight | Percent molar | | | |
| 10A | 50 | 72 | 22 | [2] 0.26 | 0.4 | 6 | 67 | 23.5 | 0.2 | 0.3 | 58.9 | 140 | |
| 10B | 54 | 78 | 24 | 0.4 | 0.3 | 5.5 | 73 | 8.75 | <0.5 | <.36 | 56.5 | 142 | 74.1 |
| 10C | 54 | 78 | 24 | 0.4 | 0.3 | 6.25 | 79 | 9.5 | <0.5 | <.36 | 62.8 | 178 | 72.6 |
| 10D | 54 | 78 | 24 | [2] 0.4 | [2] 0.6 | 5.5 | 73 | 9.5 | <0.5 | <.74 | 63.8 | 182 | 76.4 |
| 10E | 50 | 72 | 22 | 0.65 | 0.48 | 7 | 74 | 10 | 0.3 | 0.22 | 64.1 | 116/156 | |
| 10F | 50 | 78 | 28 | 1.0 | 0.73 | 6 | 70 | 9.5 | 0.79 | 0.51 | 62.5 | 180 | 76.2 |
| 10G | 54 | 78 | 24 | 1.0 | 0.73 | 4.75 | 68 | 12.7 | 0.76 | 0.55 | 57.7 | 132 | 74.2 |
| 10H | 54 | 78 | 24 | 1.0 | 0.73 | 5.5 | 73 | 9 | 0.66 | 0.48 | 59.3 | 152 | 74.5 |
| 10I | 54 | 78 | 24 | 1.0 | 0.73 | 6.25 | 79 | 9 | 0.54 | 0.40 | 60.5 | 182 | 73.1 |
| 10J | 40 | 78 | 38 | 3.0 | 2.2 | 11 | 42 | 12.75 | 2.3 | 1.68 | 60.8 | 128 | 72.1 |
| 10K | 45 | 78 | 33 | 3.0 | 2.2 | 7 | 49 | 7.8 | 2.1 | 1.53 | 57.5 | 121 | 72.1 |
| 10L | 50 | 78 | 28 | 3.0 | 2.2 | 5.5 | 66 | 9 | 2.1 | 1.53 | 62.9 | 120 | 72.6 |
| 10M | 50 | 72 | 22 | 6.1 | 4.4 | 7 | 74 | 14.5 | 3.6 | 2.6 | 62.4 | 110 | |

[1] Based on initial amount of vinyl chloride used.
[2] Propylene injected in place of vinyl acetate.

NOTE.—In the case of the product of run 10E, the composition partly gelled at 116° C. and the rest gelled at 156° C.

TABLE 6

| | Polymerization temperature | | | Comonomer | | | When comonomer added to temperature changed | | Total reaction time (hrs.) | Yield[1] (percent) | Amount of comonomer in copolymer | | K value | Gelation temperature (° C.) (70 gm.) |
|---|---|---|---|---|---|---|---|---|---|---|---|---|---|---|
| | | | | | Amount[1] | | | Approximate conversions (percent)[1] | | | | | | |
| Run No. | Initial Ti (° C.) | Final Tf (° C.) | Tf-Ti (° C.) | Nature | Percent by wt. | Percent molar | Time (hours) | | | | Weight, percent | Molar, percent | | |
| 9A | 54 | 78 | 24 | Methyl methacrylate. | 6 | 3.8 | 3.75 | 60 | 7.3 | 73 | 7.1 | 4.6 | | 148 |
| 9B | 54 | 54 | 0 | do | 8 | 5.2 | 3.75 | 60 | 9 | 44 | 6.7 | 4.3 | 61 | 120 |
| 9C | 54 | 78 | 24 | do | 8 | 5.2 | 3.75 | 60 | 6.5 | 86 | 8.3 | 5.6 | 55.7 | 157 |
| 9D | 54 | 54 | 0 | 90% methyl methacrylate, 10% ethyl acrylate. | 8 | 5.2 | 3.5 | 55 | 9 | 57 | 5.9 | 3.8 | 60.2 | 106 |
| 9E | 54 | 78 | 24 | do | 8 | 5.2 | 3.5 | 55 | 7.7 | 88 | 8.0 | 5.2 | | 138 |
| 9F | 54 | 78 | 24 | Vinyl acetate | 7 | 5.4 | 3.5 | 55 | 4.5 | 85 | 4.7 | 3.5 | 54.8 | 136 |
| 9G | 50 | 78 | 28 | do | 7 | 5.2 | 3.75 | 42 | 5.7 | 81 | 5.2 | 3.8 | 52.5 | 150 |

[1] Based on initial amount of vinyl chloride used.

EXAMPLE 12

The procedure of Example 4 was repeated but using 21.1 gm. of diisopropylperoxy-dicarbonate and using an initial polymerisation temperature of 50° C. and injecting ethylene after 5 hours (corresponding to a conversion of 62%) until the pressure in reaction vessel reached 200 p.s.i.g. The polymerisation was continued at a final polymerisation temperature of 72° C. The resultant polymer contained 1.4% of ethylene and had a K-value of 61.5 and a gelation temperature (measured on a 70 gm. charge by the technique described hereinbefore) of 168° C.

EXAMPLE 13

A series of polymerisations were performed following the procedure of Example 8 and increasing the polymerisation temperature from 55.5° C. to 78° C. and injecting the comonomer (vinyl acetate) after varying times. For comparative purposes a vinyl chloride homopolymer was also made.

The gelation temperatures of the resulting polymers were measured by the technique described hereinbefore using a 70 gm. charge weight.

The polymerisation data and results are set out in Table 9. It is seen from these results that the best gelation characteristics are obtained if the comonomer is added before 68% conversion.

It is thus seen that processing of the copolymer made according to the process of the invention requires less torque to extrude it and gives a pipe of equivalent surface finish and also markedly superior impact strength to a conventional extrusion composition.

In addition to injecting the comonomer, chain transfer agents such as trichloroethylene, tetrachloroethane, chloroform, carbon tetrachloride or xylene may also be added. Where such a chain transfer agent is injected, the increase in temperature used may be smaller, and is preferably 5–20° C. higher than the first stage polymerisation temperature. The amount of chain transfer agent used is preferably within the range 0.2 to 4% particularly 0.5 to 2% by weight of the original vinyl chloride charge.

We claim:

1. A process for the production of a vinyl chloride polymer comprising polymerizing vinyl chloride by means of a free radical yielding initiator at a first polymerization temperature within the range 30° C. to 80° C. until at least 40% by weight of the vinyl chloride is converted to polymer and then adding an ethylenically unsaturated monomer, other than vinyl chloride, which is copolymerizable with vinyl chloride to form a copolymer of lower softening point than that of polyvinyl chloride, in an amount by weight of less than the weight of the remaining unreacted vinyl chloride and then polymerizing the mixture of the remaining vinyl chloride and the comonomer

TABLE 8

| Run No. | Polymerisation temperature | | | Amount of propylene added | | Time when temperature raised | | Total reaction Time (hrs.) | Amount of comonomer in copolymer | | K value | Gelation temperature (° C.) (70 gm. charge) |
|---|---|---|---|---|---|---|---|---|---|---|---|---|
| | Initial Ti (° C.) | Final Tf (° C.) | Tf-Ti (° C.) | Percent by weight | Percent molar | Time (hrs.) | Approximate conversion, percent | | Percent by weight | Percent molar | | |
| 11A | 50 | 50 | 0 | 6.5 | 9.3 | | | 24 | 3.5 | 5.1 | 50.5 | 139 |
| 11B | 50 | 70 | 20 | 6.5 | 9.3 | 9 | 60 | 14 | 3.9 | 5.7 | 49.1 | 143 |

TABLE 9

| Run No. | Polymerisation temperatures | | | Amount of vinyl acetate injected | | When vinyl acetate injected and temperature increased | | Total reaction time (hrs.) | Amount of comonomer in copolymer | | K value | Gelation temperature (° C.) (70 gm. charge) | ½₀ Vicat softening point (° C.) |
|---|---|---|---|---|---|---|---|---|---|---|---|---|---|
| | Initial Ti (° C.) | Final Tf (° C.) | Tf-Ti, ° C. | Percent by weight | Percent molar | Time (hrs.) | Approximate conversion, percent | | Percent by weight | Percent molar | | | |
| 13A | 55.5 | 78 | 22.5 | 3 | 2.2 | 4.5 | 74 | 5.25 | 2.1 | 1.54 | 59.4 | 192 | 74.5 |
| 13B | 55.5 | 78 | 22.5 | 3 | 2.2 | 4 | 68 | 6 | 2.1 | 1.54 | 57.2 | 160 | 71.7 |
| 13C | 55.5 | 78 | 22.5 | 3 | 2.2 | 3.5 | 61 | 5.25 | 2.3 | 1.68 | 55.1 | 151 | 72.8 |
| 13D | 57 | 57 | 0 | 0 | 0 | | | 6.5 | 0 | 0 | 60 | 198 | 76.6 |

Power blend formulations were made up in a Henschel mixer using the following formulations:

| | Powder blend, parts | | |
|---|---|---|---|
| | A | B | C |
| Product of Run 13C | 100 | 0 | 0 |
| Product of Run 13D | 0 | 100 | 100 |
| Processing aid [1] | 0 | 0 | 2 |
| Stearate coated calcium carbonate | 10 | 10 | 10 |
| Stabilisers and lubricants | 5.35 | 5.35 | 5.35 |

[1] A commercially available processing aid based on a methyl methacrylate polymer.

The formulations were extruded into 3″ class C pipe on a Schloemann BT 80 extruder using a temperature profile of 158/173/170/165/178/190° C. and a screw speed of 8.75 r.p.m.

The properties of the formulations were as follows:

| Blend | Torque (extruder drive current (amps)) | Extruder output (lb./hr.) | Surface finish | Impact strength of pipe (ft. lb.) |
|---|---|---|---|---|
| A | 16.5 | 88 | Slight ripple, good gloss | 73 |
| B | 20 | 88 | Slight ripple, little gloss | <23 |
| C | 19 | 92 | Slight ripple, good gloss | 84 | to form a copolymer of lower softening point than polyvinyl chloride, characterized in that the mixture of the remaining vinyl chloride and the comonomer is polymerized at a temperature in the range 35° C. to 85° C. and which is at least 5° C. higher than said first polymerization temperature.

2. A process as claimed in claim 1 wherein the amount of comonomer added is from 0.1 to 10% by weight of the original vinyl chloride charge.

3. A process as claimed in claim 2 wherein the amount of comonomer added is at least 0.2% by weight of the original vinyl chloride charge.

4. A process as claimed in claim 2 wherein the amount of comonomer added is less than 5% by weight of the original vinyl chloride charge.

5. A process as claimed in claim 1 in which the comonomer is added when from 40 to 95% by weight of the vinyl chloride has been converted to polymer.

6. A process as claimed in claim 5 in which the comonomer is added when from 40 to 70% by weight of the vinyl chloride has been converted to polymer.

7. A process as claimed in claim 6 in which the comonomer is added when from 42 to 65% by weight of the vinyl chloride has been converted to polymer.

8. A process as claimed in claim 1 wherein the mixture of vinyl chloride and comonomer is polymerised at a temperature from 10 to 35° C. greater than the first polymerisation temperature.

9. A process as claimed in claim 8 in which the mixture of vinyl chloride and comonomer is polymerised at a temperature from 15 to 30° C. greater than the first polymerisation temperature.

10. A process as claimed in claim 1 wherein the first polymerisation temperature is in the range 35 to 60° C.

11. A process as claimed in claim 1 wherein the second polymerisation temperature is in the range 65 to 80° C.

12. A process as claimed in claim 1 wherein the comonomer is selected from the group consisting of vinyl acetate, vinylidene chloride, ethyl acrylate, methyl methacrylate, ethylene and propylene.

13. A process as claimed in claim 1 in which the polymerisation is conducted in aqueous suspension.

References Cited
UNITED STATES PATENTS 2,763,635    9/1956    Tucker et al. _____ 260—92.8W HARRY WONG, Jr., Primary Examiner U.S. Cl. X.R.

204—159.15, 169.16, 159.17, 159.18; 260—29.6, 41, 45.7, 87.1, 87.5, 87.7, 92.8, 897, 899; 264—175